United States Patent
Onoe et al.

(10) Patent No.: US 10,159,935 B2
(45) Date of Patent: *Dec. 25, 2018

(54) EXHAUST GAS PURIFICATION CATALYST

(71) Applicants: CATALER CORPORATION, Kakegawa-shi, Shizuoka (JP); TOYOTA JIDOSHA KABUSHIKI KAISHA, Toyota-shi, Aichi-ken (JP)

(72) Inventors: Ryota Onoe, Kakegawa (JP); Shingo Sakagami, Kakegawa (JP); Tsuyoshi Ito, Kakegawa (JP); Masahiko Takeuchi, Toyota (JP); Naoto Miyoshi, Toyota (JP); Akemi Sato, Toyota (JP)

(73) Assignees: CATALER CORPORATION, Kakegawa (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/517,990

(22) PCT Filed: Oct. 7, 2015

(86) PCT No.: PCT/JP2015/078550
§ 371 (c)(1),
(2) Date: Apr. 10, 2017

(87) PCT Pub. No.: WO2016/060049
PCT Pub. Date: Apr. 21, 2016

(65) Prior Publication Data
US 2017/0304773 A1    Oct. 26, 2017

(30) Foreign Application Priority Data
Oct. 16, 2014    (JP) ................................ 2014-211380

(51) Int. Cl.
*B01D 53/94* (2006.01)
*B01J 35/04* (2006.01)
(Continued)

(52) U.S. Cl.
CPC ....... *B01D 53/945* (2013.01); *B01D 53/9468* (2013.01); *B01J 35/04* (2013.01);
(Continued)

(58) Field of Classification Search
None
See application file for complete search history.

(56) References Cited

U.S. PATENT DOCUMENTS

2006/0057046 A1    3/2006    Punke et al.
2007/0224092 A1*   9/2007    Miyairi ............. B01D 46/2429
                                                          422/180
(Continued)

FOREIGN PATENT DOCUMENTS

EP    2 161 720 A1    3/2010
EP    2161420 A1      3/2010
(Continued)

OTHER PUBLICATIONS

Oct. 12, 2017 Search Report issued in European Patent Application No. 15850544.6.
(Continued)

*Primary Examiner* — Walter D. Griffin
*Assistant Examiner* — Jelitza M Perez
(74) *Attorney, Agent, or Firm* — Oliff PLC (57) ABSTRACT

An exhaust gas purification catalyst having an excellent exhaust gas purification ability while reducing the increase in pressure loss. Exhaust gas purification catalyst includes entrance cell, exit cell, and a wall-flow substrate having partition wall to separate these cell, a catalytic layer formed from exhaust inlet-side ends in the extending direction in
(Continued)

sections of the interior of partition wall facing entrance cell, and a catalytic layer formed on the surface of partition wall facing exit cell from exhaust outlet-side ends in the extending direction of partition wall, having a length shorter than the entire partition wall length.

13 Claims, 2 Drawing Sheets

(51) Int. Cl.
    *B01J 37/02*     (2006.01)
    *F01N 3/28*     (2006.01)
    *F01N 3/022*     (2006.01)

(52) U.S. Cl.
    CPC ........ *B01J 37/0244* (2013.01); *F01N 3/0222* (2013.01); *F01N 3/2803* (2013.01); *B01D 2255/1021* (2013.01); *B01D 2255/1025* (2013.01); *B01D 2255/2092* (2013.01); *B01D 2255/407* (2013.01); *B01D 2255/9155* (2013.01); *F01N 2510/0682* (2013.01); *Y02T 10/20* (2013.01); *Y02T 10/22* (2013.01)

(56) References Cited

U.S. PATENT DOCUMENTS

| | | | |
|---|---|---|---|
| 2009/0087365 | A1 | 4/2009 | Klingmann et al. |
| 2010/0175372 | A1 | 7/2010 | Lambert et al. |
| 2011/0030346 | A1 | 2/2011 | Neubauer et al. |
| 2011/0078997 | A1 | 4/2011 | Boorse et al. |
| 2011/0123421 | A1 | 5/2011 | Grubert |
| 2012/0247092 | A1 | 10/2012 | Boorse |
| 2013/0136662 | A1 | 5/2013 | Choi et al. |
| 2014/0044626 | A1* | 2/2014 | Greenwell ............ F01N 3/101 423/212 |
| 2014/0134062 | A1 | 5/2014 | Kwon |
| 2015/0292387 | A1 | 10/2015 | Nishioka et al. |

FOREIGN PATENT DOCUMENTS

| | | | |
|---|---|---|---|
| EP | 2781261 | A1 | 9/2014 |
| EP | 2 873 817 | A1 | 5/2015 |
| JP | 2007-185571 | A | 7/2007 |
| JP | 2009-082915 | A | 4/2009 |
| JP | 2010-269205 | A | 12/2010 |
| JP | 2012-236180 | A | 12/2012 |
| JP | 2013-500857 | A | 1/2013 |
| JP | 2013-506787 | A | 2/2013 |
| JP | 2013-511379 | A | 4/2013 |
| WO | 2011/041769 | A2 | 4/2011 |
| WO | 2014/002772 | A1 | 1/2014 |
| WO | 2014/076767 | A1 | 5/2014 |

OTHER PUBLICATIONS

Oct. 20, 2017 Extended European Search Report issued in European Patent Application No. 15851481.0.
Mar. 1, 2018 Office Action issued in Japanese Patent Application No. 2016-554055.
Jun. 28, 2018 Office Action issued in U.S. Appl. No. 15/518,011.

* cited by examiner

FIG.1

→ Extending direction (axial direction)

EXHAUST GAS PURIFICATION CATALYST

TECHNICAL FIELD

The present invention relates to an exhaust gas purification catalyst provided to an exhaust system of an internal combustion system. In particular, it relates to a wall-flow type exhaust gas purification catalyst.

The present application claims priority to Japanese Patent Application No. 2014-211380 filed on Oct. 16, 2014; the entire contents of which are incorporated herein by reference.

BACKGROUND ART

Exhaust gas emitted from an internal combustion system such as an automobile engine comprises toxic components such as particulate matter (PM), hydrocarbons (HC), carbon monoxide (CO), and nitrogen oxides (NOx).

Conventionally, a wall-flow type exhaust gas purification catalyst is used to efficiently eliminate these exhaust components.

A wall-flow exhaust gas purification catalyst comprises entrance cells with open ends on the exhaust inlet side, exit cells with open ends on the exhaust outlet side, and porous partition walls (ribbed walls) to separate the two types of cells. Exhaust gas emitted from the internal combustion system flows via the exhaust inlet-side ends into the entrance cells, passes through micro pores of the porous partition walls, and flows out of the exhaust outlet-side ends of the exit cells. When the exhaust is in contact with the catalytic layer (catalytic metal), the exhaust components are purified (detoxified).

Conventional art literature related to this includes Patent Documents 1 and 2. For instance, Patent Document 1 discloses an exhaust gas purification catalyst comprising catalytic layers in a two-layer configuration. In particular, it discloses an exhaust gas purification catalyst comprising a Pd-containing catalytic layer (a first catalytic layer) throughout the interior of its partition walls and further comprising an Rh-containing catalytic layer (a second catalytic layer) on the surface of its partition walls in contact with the entrance cells to completely cover the first catalytic layer.

CITATION LIST

Patent Literature

[Patent Document 1] Japanese Patent Application Publication No. 2009-82915
[Patent Document 2] Japanese Patent Application Publication No. 2007-185571

SUMMARY OF INVENTION

According to the studies by the present inventors, however, there has been some room for improvement with respect to the location of the catalytic metal in the exhaust gas purification catalyst. In other words, such the exhaust gas purification catalyst comprises the first catalytic layer throughout the interior of its partition walls and the second catalytic layer is formed entirely over the first catalytic layer. Like this, when the surface of the entrance cells were covered with a catalytic layer, pressure loss may have increased excessively.

The present invention has been made in view of such circumstances with an objective to provide an exhaust gas purification catalyst with which the increase in pressure loss is reduced while showing excellent exhaust gas purification ability.

The present inventors have carried out earnest studies in various aspects and have come to create an invention capable of achieving the objective.

The exhaust gas purification catalyst according to this invention is a wall-flow type exhaust gas purification catalyst placed in an exhaust pipe of an internal combustion system such as an automobile engine to purify exhaust gas emitted from the internal combustion system. The exhaust gas purification catalyst disclosed herein comprises a substrate having a wall-flow structure, a first catalytic layer and a second catalytic layer. The substrate comprises entrance cells having open ends on the exhaust inlet side, their adjacent exit cells having open ends on the exhaust outlet side, and porous partition walls to separate the two types of cells. The first catalytic layer is formed in the interior of the partition walls facing (in contact with) the entrance cells; it is formed from the exhaust inlet-side ends in the extending direction (axial direction) of the partition walls. The second catalytic layer is formed on the surface of the partition walls facing the exit cells; it is formed from the exhaust outlet-side ends in the extending direction of the partition walls, having a length shorter than the entire length $L_w$ of the partition walls.

Upon entering the entrance cells, exhaust gas passes through the interior of the partition walls (through the interior of micro pores of the partition walls). Thus, by providing the first catalytic layer to the interior of the partition walls, exhaust gas can be effectively purified while passing through the partition walls. In addition, after having passed through the partition walls, the exhaust gas often flows linearly towards the exhaust outlet-side ends of the exit cells. Thus, formed on the surface of the partition walls facing the exit cells, the second catalytic layer can make proper contact with the exhaust gas flowing straight through the exit cells. As a result, the purification performance can be maintained or increased. In addition, the increase in pressure loss can be reduced with the first catalytic layer formed in the interior of the partition walls and the second catalytic layer having a length $L_2$ in its extending direction shorter than the entire partition wall length $L_w$. Thus, this configuration can reduce the increase in pressure loss while increasing the exhaust gas purification performance.

In this description, the condition that a catalytic layer is "formed in the interior of partition walls" means that most of the catalytic layer is present (concentrated) in the interior of the partition walls. For example, it means the following: when the first catalytic layer is observed in a cross section under an electron microscope, with the total amount of the catalytic metal over a length of $0.1L_w$ in the extending direction from the exhaust inlet-side ends being 100% by mass, the catalytic metal content present inside the partition walls is, but not particularly limited to, 80% by mass or greater, for instance, 90% by mass or greater, or preferably 95% by mass or greater. Thus, it is clearly distinct from an embodiment where, for instance, as a result of forming a catalytic layer on the exterior (typically on the surface) of partition walls, part of the catalytic layer has diffused inadvertently into the partition walls.

In another preferable embodiment of the exhaust gas purification catalyst disclosed herein, the length Ls of the second catalytic layer in the extending direction is 10% or greater, but 50% or less of the length $L_w$. With $L_2$ being 50% or less of $L_w$, the increase in pressure loss can be reduced to a greater extent. With the catalytic metal provided to sections from the exhaust outlet-side ends that account for at least 10% of the entire length of the partition walls in the extending direction, the exhaust gas purification ability can be more favorably displayed.

In another preferable embodiment of the exhaust gas purification catalyst disclosed herein, the length $L_1$ of the first catalytic layer in the extending direction is 60% or greater, but 90% or less of the length $L_w$. In other words, in the interior of the partition walls, the first catalytic layer is suitably formed from the exhaust outlet-side ends in the extending direction of the partition walls, having a length shorter than the entire partition wall length $L_w$. Especially when $L_1$ is 90% or less of $L_w$, the increase in pressure loss can be reduced to a greater extent. With the catalytic metal provided to sections from the exhaust outlet-side ends that account for at least 60% of the entire length of the partition walls in the extending direction, the exhaust gas purification ability can be even more favorably displayed.

In another preferable embodiment of the exhaust gas purification catalyst disclosed herein, in the thickness direction vertical to the extending direction, with the overall thickness of a partition wall being $T_w$, the second catalytic layer is formed to a thickness equivalent to 30% or less of the thickness $T_w$ on the surface of the partition walls facing the exit cells. With the second catalytic layer formed relatively thin, the increase in pressure loss can be reduced to a greater extent.

In another preferable embodiment of the exhaust gas purification catalyst disclosed herein, in the thickness direction vertical to the extending direction, with the overall partition wall thickness being $T_w$, the first catalytic layer is formed to at least 30% of the thickness $T_w$ in the interior of the partition walls. With the catalytic metal being extensively diffused and carried on, it is possible to favorably reduce the increase in pressure loss while producing high exhaust gas purification performance.

In another preferable embodiment of the exhaust gas purification catalyst disclosed herein, in the extending direction, with the lengths of the first and second catalytic layers being $L_1$ and $L_2$, the first and second catalytic layers are formed with partial overlapping in the extending direction so as to satisfy the next inequality $L_w<(L_1+L_2)<2L_w$. The first and second catalytic layers partially overlapping in the extending direction can prevent exhaust gas from "escaping" so as to properly purify (detoxify) the exhaust components. Thus, exhaust emissions can be effectively reduced. Accordingly, higher exhaust gas purification performance can be achieved.

In another preferable embodiment of the exhaust gas purification catalyst disclosed herein, the overlapping length of the first and second catalytic layers is 5% or greater, but 20% or less of the length $L_w$. By this, the effects of the present invention can be brought to a higher level.

DESCRIPTION OF EMBODIMENTS

Some preferred embodiments of the present invention are described below with reference to drawings. In the drawings below, a common reference numeral may be assigned to members or sites producing the same effects, and duplicated descriptions are sometimes omitted or simplified. Dimensional relationships (length, width, thickness, etc.) in the respective drawings do not necessarily represent the accurate dimensional relationships. Matters necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field.

The exhaust gas purification catalyst disclosed herein comprises a substrate having a wall-flow structure, and two catalytic layers provided to the partition walls of the substrate. It is characterized by that the catalytic layer (first catalytic layer) relatively close to the entrance cells is placed in the partition walls (specifically, in micro pores of the partition walls) while the catalytic layer (second catalytic layer) relatively close to the exit cells is placed on the partition walls (on the partition wall surface). Thus, there are no particular limitations to other features. With suitable selection of the substrate, support, and catalytic metal, the exhaust gas purification catalyst of the present invention can be made in a desirable shape in accordance with the application.

Figure 1:
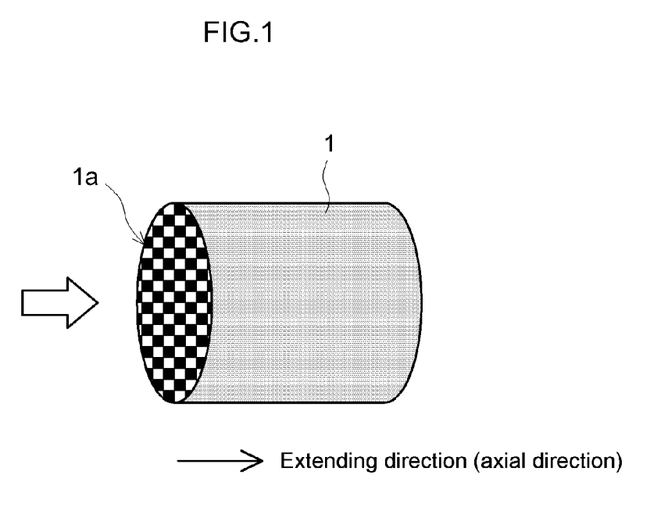
FIG. 1 shows a perspective diagram schematically illustrating the substrate for the exhaust gas purification catalyst according to an embodiment of the present invention.
Figure 2:
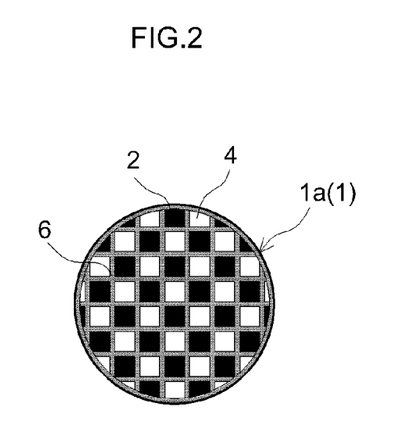
FIG. 2 shows a cross-sectional diagram schematically illustrating an end of the honeycomb substrate in FIG. 1.

The substrate having a wall-flow structure is first described. The substrate constitutes the frame of the exhaust gas purification catalyst disclosed herein. For the substrate, a species that is conventionally used for this type of application can be suitably selected. FIG. 1 shows a schematic diagram illustrating an example of the substrate. The substrate shown in FIG. 1 is a honeycomb substrate (honeycomb structure) 1 having a cylindrical outer shape. Honeycomb substrate 1 has several cells regularly arranged in the extending direction of honeycomb substrate 1 (in the axial direction of the cylindrical shape) and partition walls that separate the cells. With respect to adjacent cells, their open ends on the two opposite sides (inlet and outlet sides) in the extending direction are alternately closed. FIG. 2 shows a schematic diagram illustrating an end 1a of honeycomb substrate 1 in a cross section. In this embodiment, the end 1a has an approximately circular shape. At the end 1a, plugs 2 and cell openings 4 are arranged in a checkerboard pattern. Between the plugs 2 and cell openings 4, porous partition walls 6 are placed.

For instance, honeycomb substrate 1 is suitably formed from a heat-resistant material so as to be effective even when it is exposed to a high temperature (e.g. 400° C. or higher) occurring when the internal combustion system is run under high pressure or when PM is eliminated by combustion at a high temperature. Examples of the heat-resistant material include ceramic such as cordierite, aluminum titanate and silicon carbide (SiC), and alloys such as stainless steel. Honeycomb substrate 1 has a capacity (a total cell volume) of usually 0.1 L or greater, or preferably 0.5 L or greater; for instance, it is suitably 5 L or less, preferably 3 L or less, or more preferably 2 L or less. The overall length (i.e. the entire length $L_w$ across partition walls 6 in the extending direction (the extending length $L_w$ of partition walls 6)) is usually suitably 10 mm to 500 mm, for instance, about 50 mm to 300 mm. From the standpoint of increasing the exhaust gas purification ability and the mechanical strength as well as of reducing the pressure loss, etc., the thickness of partition walls 6 (their length in the direction vertical to the extending direction) is, for instance, suitably about 0.05 mm to 2 mm. From the standpoint of increasing the mechanical strength and reducing the pressure loss, etc., the porosity of partition walls 6 is usually suitably around 40% to 70%. From the standpoint of increasing the PM-collecting ability and reducing the pressure loss, the average pore diameter of partition walls 6 is usually suitably about 10 μm to 40 μm. Instead of the cylindrical shape as shown in FIG. 1, the overall outer shape of honeycomb substrate 1 can be, for instance, elliptical cylindrical, polygonal cylindrical, etc.

Described next is an exhaust gas purification catalyst formed with honeycomb substrate 1.

Figure 3:
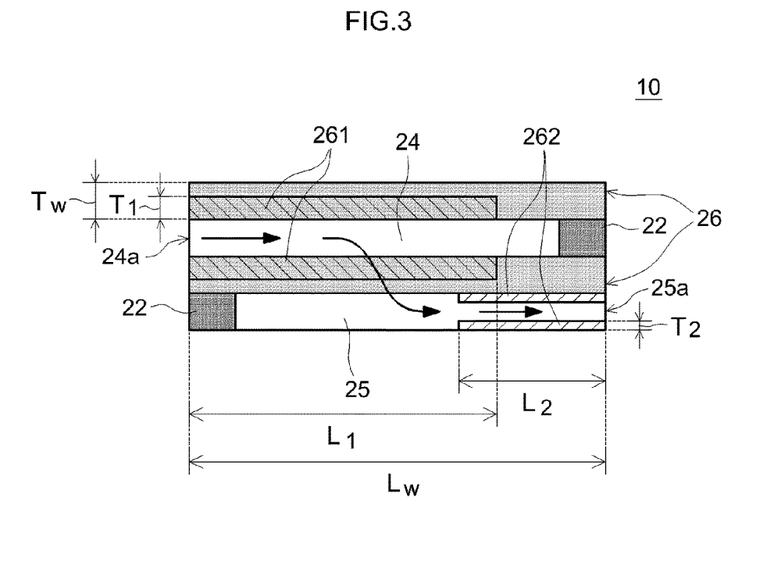
FIG. 3 shows an enlarged cross-sectional diagram schematically illustrating the construction of the exhaust gas purification catalyst in the vicinity of some partition walls according to an embodiment of the present invention.

FIG. 3 shows an enlarged cross-sectional diagram schematically illustrating the construction of exhaust gas purification catalyst 10 in the vicinity of some partition walls according to an embodiment of the present invention. In this diagram, the direction of the arrow indicates the direction of the exhaust flow. That is, the upstream of the exhaust channel (exhaust pipe) is on the left in FIG. 1; the downstream of the exhaust channel is on the right in FIG. 3. Exhaust gas purification catalyst 10 has a so-called wall-flow structure. Exhaust gas purification catalyst 10 comprises entrance cells 24 (in a U shape (sideway)) having open ends 24a on the exhaust inlet side, their adjacent exit cells 25 (in a U shape (sideway)) having open ends 25a on the exhaust outlet side, and porous partition walls 26 to separate the two types of cells. Plugs 22 are placed and sealed in the exhaust outlet-side ends 25a of the entrance cells 24 and exhaust inlet-side ends 24a of the exhaust exit cells 25, respectively. In the interior of partition walls 26, the first catalytic layer 261 having prescribed characteristics (e.g. length, thickness, amount of precious metal carried) is formed. Of partition walls 26, on the surface facing the exit cells 25, the second catalytic layer 262 having prescribed characteristics (e.g. length, thickness, amount of precious metal carried) is formed.

In exhaust gas purification catalyst 10 in such an embodiment, exhaust gas emitted from the internal combustion system flows via exhaust inlet-side ends 24a into entrance cells 24, passes through micro pores of porous partition walls 26, and flows out of exhaust outlet-side ends 25a of exit cells 25. While passing through exhaust gas purification catalyst 10, toxic components of the exhaust gas come in contact with the catalytic layers and are thereby purified (detoxified). For instance, HC and CO in the exhaust gas are oxidized by the catalytic activities of the catalytic layer(s) and converted (purified) to water ($H_2O$), carbon dioxide ($CO$), etc.; $NO_x$ is reduced by the catalytic activities of the catalytic layer(s) and converted (purified) to nitrogen (N). PM is less likely to pass through micro pores of partition walls 26; and therefore, it generally accumulates on partition walls 26 in entrance cells 24. The accumulated PM is decomposed and removed by the catalytic activities of the catalytic layer(s) or by combustion at a certain temperature (e.g. around 500° C. to 700° C.).

As for places where exhaust gas is purified, the two catalytic layers (the first and second catalytic layers 261 and 262) constitute the primary part of exhaust gas purification catalyst 10. The two catalytic layers individually comprise catalytic metal particles serving as oxidation and/or reduction catalyst(s), and a support carrying the catalytic metal particles.

As for the catalytic metal, various metal species capable of serving as oxidation catalysts or reduction catalysts can be considered. Typical examples include precious metals such as rhodium (Rh), palladium (Pd) and platinum (Pt) of the platinum group. Alternatively, ruthenium (Ru), osmium (Os), iridium (Ir), silver (Ag), gold (Au) and the like can be used as well. An alloy of two or more species among these metals can also be used. Other possible metal species include alkali metals, alkaline earth metals and transition metals. From the standpoint of increasing the contact area with exhaust gas, the catalytic metal is preferably used as fine particles having sufficiently small particle diameters. The catalytic metal particles preferably have an average particle diameter (the average value of particle diameters determined by transmission electron microscopy; the same applies hereinafter) of usually about 1 nm to 15 nm; it is suitably 10 nm or smaller, 7 nm or smaller, or even 5 nm or smaller.

The metal species in the first and second catalytic layers 261 and 262 can be the same or different. For example, a highly reducing metal species (e.g. rhodium) is used in one catalytic layer (e.g. the first catalytic layer 261) and a highly oxidizing metal species (e.g. palladium and/or platinum) can be used in the other catalytic layer (e.g. the second catalytic layer 262). As for another example, the same metal species (e.g. rhodium) can be used in the two catalytic layers (the first and second catalytic layers 261 and 262).

In a preferable embodiment, the first catalytic layer 261 near the exhaust inlet side comprises at least Rh or an alloy of Rh and the second catalytic layer 262 near the exhaust outlet side comprises at least Rh, Pd, Pt, or an alloy of these. This allows the catalytic metals to produce high levels of purification activity.

The catalytic metal-carrying rates of the first and second catalytic layers 261 and 262 (their catalytic metal contents with the support being 100% by mass) can be the same or different. The rate of catalytic metal carried in each catalytic layer may also vary in accordance with, for instance, the length and thickness of the catalytic layer; and therefore, it is not particularly limited; it is generally 1.5% by mass or lower, preferably 0.05% to 1.5% by mass, or more preferably 0.2% to 1% by mass. When their catalytic metal-carrying rates are at or above certain values, it is easier to obtain the exhaust gas purification effects of the catalytic metals. When their catalytic metal-carrying rates are at or below certain values, progress in growth of particles (sintering) of the metals can be inhibited and the increase in pressure loss can be reduced. It is also advantageous in view of the cost.

In a favorable embodiment, relative catalytic metal-carrying rates are low in the first catalytic layer 261 and high in the second catalytic layer 262. In other words, it is preferable that the first catalytic layer 261 is provided at a relatively low catalytic metal-carrying rate to a large part while the second catalytic layer 262 is provided locally (in a concentrated manner) at a relatively high catalytic metal-carrying rate. This can bring about the effects (i.e. reduction of pressure loss and/or increased purification ability) of the present invention to higher levels.

The support that carries the catalytic metal can be an inorganic compound conventionally used with exhaust gas purification catalysts of this type. In particular, it is preferable to use a porous support having a relatively large specific surface area (which refers to the specific surface area measured by a BET method here; the same applies hereinafter). Favorable examples include alumina ($Al_2O_3$), ceria ($CeO_2$), zirconia ($ZrO_2$), silica ($SiO_2$), titania ($TiO_2$), a solid solution of these (e.g. ceria-zirconia composite oxide (CZ composite oxide)) and a combination of these. From the standpoint of the heat resistance and structural stability, the support particles (e.g. alumina powder, CZ composite oxide powder) suitably have a specific surface area of 10 m²/g to 500 m²/g, for example, 200 m²/g to 400 m²/g. The support particles suitably have an average particle diameter of typically 1 nm to 500 nm, for example, 10 nm to 200 nm. The support species in the first and second catalytic layers 261 and 262 may be the same or different.

In internal sections of partition walls 26 facing entrance cells 24, the first catalytic layer 261 is formed from the exhaust inlet-side ends 24a, having a prescribed length in the extending direction. Upon entering the entrance cells 24, exhaust gas passes through partition walls 26. Thus, with the first catalytic layer 261 provided to the interior of partition walls 26, the exhaust gas purification performance during passage through partition walls 26 can be effectively enhanced. According to the studies by the present inventors, such an embodiment is particularly effective also in view of reducing the pressure loss that occurs when exhaust gas flows in.

The length (average length) $L_1$ of the first catalytic layer 261 in its extending direction is not particularly limited. It is usually preferably shorter than the entire length $L_w$ of partition walls 26; it is generally 30% or greater of $L_w$, typically 50% or greater, for example, 60% or greater, or preferably 70% or greater; it is generally suitably 95% or less, typically 90% or less, for example, 80% or less. In the embodiment shown in FIG. 3, the length $L_1$ of the first catalytic layer 261 is about 80% of the length $L_w$. When a large part of partition walls 26 is coated with the catalytic metal, the chances for exhaust gas and the catalytic metal to come in contact can be increased, whereby high purification performance can be obtained. According to the studies by the present inventors, the vicinity of plugs 22 of entrance cells 24 tends to easily accumulate ash formed of nonflammable components. Thus, depending on the exhaust components, the pressure loss my increase in areas where the ash has accumulated, making the exhaust flow sluggish. With $L_1$ at or below a certain value (i.e. by placing the first catalytic layer 261 outside the vicinity of the plugs 22), the increase in pressure loss can be favorably reduced. With $L_1$ at or above a certain value, more favorable exhaust gas purification performance can be obtained.

The thickness (average thickness) $T_1$ of the first catalytic layer 261 may vary depending on, for instance, the thickness $T_w$ and length $L_1$ in the extending direction of partition walls 26, etc.; and therefore, it is not particularly limited. In typical, it is generally 30% or greater of $T_w$, typically 40% or greater, preferably 50% or greater, or more preferably 60% or greater, for example, 80% or greater. For instance, it can be formed across almost the entirety (≥98%) of partition walls 26 in the thickness direction. The catalytic metal present in a large part can reduce the pressure loss while more greatly increasing the chances for exhaust gas and the catalytic metal to come in contact. In a preferable embodiment, to prevent the first catalytic layer 261 from coming in contact with exit cells 25, $T_1$ is less than 100% of $T_w$ and typically 95% or less, for example, 90% or less. This can inhibit sintering and alloying of the catalytic metal to a great extent, whereby the exhaust gas purification catalyst can be obtained with greater durability.

On the surface facing exit cells 25 of partition walls 26, the second catalytic layers 262 are formed from exhaust outlet-side ends 25a in the extending direction, having a length shorter than the entire length $L_w$ of partition walls 26. This can reduce the pressure loss while bringing about high exhaust gas purification performance. In particular, upon passing through partition walls 26, exhaust gas often moves linearly toward ends 25a in the exit cells 25. Thus, with the second catalytic layer 262 provided to the surface facing exit cells 25 of partition walls 26, the frequency of its contacts with straight flow exhaust can be increased to more efficiently purify the exhaust that linearly moves in exit cells 25 (i.e. straight flow exhaust) after having passed through partition walls 26.

The length (average length) $L_2$ of the second catalytic layer 262 in its extending direction is not particularly limited. In typical, it is generally 10% or greater of $L_w$, typically 15% or greater, for example, 20% or greater, or preferably 25% or greater; it is generally suitably 50% or less, typically 40% or less, for example, 35% or less. In the embodiment shown in FIG. 3, the length $L_2$ of the second catalytic layer 262 is about 30% of $L_w$. This can favorably reduce the increase in pressure loss while effectively purification the exhaust gas after it has passed through partition walls 26.

The thickness (average thickness) $T_2$ of the second catalytic layer 262 may vary depending on, for instance, the overall thickness $T_w$ of a partition wall 26 as well as the length $L_2$ in the extending direction; and therefore, it is not particularly limited. In typical, it is generally suitably 50% or less of $T_w$, typically 30% or less, for example, 25% or less, or preferably 20% or less. In general, when the surface of partition walls 26 has a catalytic layer, the exit for exhaust may be closed, leading to a tendency to a greater pressure loss. With the thickness of the second catalytic layer 262 being in these ranges, the increase in pressure loss can be minimized while bringing about high purification performance against straight flow exhaust.

In a preferable embodiment, the entire length $L_w$ of partition walls 26, the length $L_1$ of the first catalytic layer 261 and the length $L_2$ of the second catalytic layer 262 satisfy the next inequality $L_w<(L_1+L_2)<2L_w$. In other words, in the extending direction of partition walls 26, the first catalytic layer 261 partially overlaps the second catalytic layer 262. The purposefully overlapped first and second catalytic layers 261 and 262 prevent the exhaust gas from passing through sections where no catalytic layers are formed and from being emitted unpurified. This allows proper contact of the exhaust components and the catalytic layers, thereby effectively reducing emissions.

The length in the extending direction over which the first and second catalytic layers 261 and 262 overlap may vary depending on, for instance, the thicknesses of the respective catalytic layers; and therefore, it is not particularly limited. In general, it is 2% or greater of $L_w$, typically 5% or greater, for instance, 10% or greater, generally 60% or less, typically 50% or less, preferably 40% or less, or more preferably 30% or less, for example, 20% or less. In particular, from the standpoint of combining cost reduction and high performance at a high level, it is preferably about 10% to 30% of $L_w$.

The catalytic layers as described above (the first and second catalytic layers) can be formed by methods similar to conventional methods.

For instance, the exhaust gas purification catalyst 10 in the embodiment shown in FIG. 3 can be formed as follows:

First, a honeycomb substrate 1 as shown in FIGS. 1 and 2 is obtained. Then, two different catalytic layer-forming slurries are prepared, each comprising a desirable catalytic metal (typically as a solution comprising the catalytic metal in an ionic form) and desirable support powder. The two slurries differ from each other in characteristics of solid contents (e.g. catalytic metal species, average particle diameter of support powder) and in other characteristics such as solid content ratio and viscosity; one (typically a slurry comprising finer support powder) is used for forming the first catalytic layer and the other (typically a slurry comprising rougher support powder (with larger particle diameters)) for forming the second catalytic layer.

In addition to the catalytic metals and supports, the two catalytic layer forming slurries can suitably comprise optional additional components such as heretofore known pore-forming material, oxygen absorbing/releasing material, binder and additives. As the pore-forming material, carbon can be preferably used. As the oxygen absorbing/releasing material, a CZ composite oxide can be preferably used as a support or a non-support. When these additional components are dispersed in the slurries, the average particle diameters of the additional components can be approximately the same as that of the support powder. As the binder, an alumina sol, a silica sol and the like can be used.

The first catalytic layer-forming slurry prepared above is then supplied via exhaust inlet-side ends 24a of honeycomb substrate 1 into entrance cells 24 to form, in micro pores of partition walls 26, the first catalytic layer 261 having desirable properties. In particular, for instance, honeycomb substrate 1 can be immersed from its exhaust inlet-side ends 24a into the first catalytic layer-forming slurry and removed after a certain time period has passed. When supplying the slurry, adjustment can be made by applying pressure to exit cells 25 to create a pressure gradient between entrance cells 24 and exit cells 25 so as to prevent the slurry from overly seeping into partition walls 26. Alternatively, after the slurry is supplied, excess slurry can be removed by spraying pressurized gas (or by suction). It can be then dried and calcined at prescribed temperatures for prescribed time periods. By this, the first catalytic layer 261 having desirable characteristics can be formed in the interior of partition walls 26. The features (e.g. thickness and porosity) of the first catalytic layer 261 can be adjusted by the properties of the slurry, its amount supplied and so on.

The second catalytic layer-forming slurry prepared above is then supplied via exhaust outlet-side ends 25a of honeycomb substrate 1 into exit cells 25 to form the second catalytic layer 262 having desirable properties on the surface of partition walls 26, on the side of exit cells 25. In particular, for instance, honeycomb substrate 1 can be immersed from its exhaust outlet-side ends 25a into the second catalytic layer-forming slurry and removed after a certain time period has passed. During this, adjustment can be made by applying pressure to entrance cells 24 to create a pressure gradient between entrance cells 24 and exit cells 25 so as to prevent the slurry from overly seeping into partition walls 26. It can be then dried and calcined at a prescribed temperature for a prescribed time. By this, the second catalytic layer 262 having desirable characteristics can be formed on the surface of partition walls 26, on the side of exit cells 25. The features (e.g. thickness and porosity) of the second catalytic layer 262 can be adjusted by the properties of the slurry, its amount supplied and so on.

After the application of the slurries, honeycomb substrate 1 is dried and calcined at prescribed temperatures for prescribed time periods. By this, exhaust gas purification catalyst 10 as shown in FIG. 3 can be produced.

The exhaust gas purification catalyst disclosed herein can provide excellent exhaust gas purification performance with a reduced increase in pressure loss.

Accordingly, it can be favorably placed in an exhaust system (exhaust pipe) of, for instance, a gasoline engine or a diesel engine of an automobile.

Several Examples related to the present invention are described below, but the present invention is not to be limited to these specific examples.

<<I. Studies on where Catalytic Layers are Formed>>

Here, effective locations for forming the second catalytic layer were examined.

EXAMPLE 1

As the substrate, was obtained a cordierite honeycomb substrate of 300 cpsi (cells per square inch) in the number of cells, 0.9 L in volume (referring to the total bulk volume including the volumes of cell channels), 105 mm in total length, 103 mm in outer diameter, 0.3 mm in partition wall thickness, 15 µm in average pore diameter and 59% in porosity.

Subsequently, were mixed 40 g of $Al_2O_3$ powder ($\gamma$-$Al_2O_3$, 1 µm average particle diameter) as a support, an aqueous rhodium solution containing 0.5 g Rh, and a suitable amount of pure water. The resulting mixture was mixed with stirring, dried and calcined (500° C., 1 hour) to obtain Rh-carrying powder. With the Rh-carrying powder, were mixed a ceria-zirconia composite oxide solution to yield 60 g of CZ composite oxide upon calcination, and a suitable amount of pure water to prepare the first catalytic layer-forming slurry. The first catalytic layer-forming slurry was supplied from the exhaust inlet-side ends of the honeycomb substrate into the entrance cells to give an Rh-carrying rate of 0.275 g per 100% by mass of support upon calcination and to form the first catalytic layer (with length $L_1$ in the extending direction, equivalent to 55% of the entire partition wall length; thickness $T_1$, equivalent to 60% of the overall partition wall thickness) in micro pores of the partition walls facing the entrance cells.

With a suitable amount of water, were then mixed 40 g of $Al_2O_3$ powder ($\gamma$-$Al_2O_3$, 1 µm average particle diameter) as a support and a suitable amount of an aqueous platinum solution containing 1.2 g Pt. The resulting mixture was mixed with stirring, dried and calcined (500° C., 1 hour) to obtain Pt-carrying powder. With the Pt-carrying powder, were mixed a ceria-zirconia composite oxide solution to yield 60 g of CZ composite oxide upon calcination, and a suitable amount of pure water to prepare the second catalytic layer-forming slurry. The second catalytic layer-forming slurry was supplied from the exhaust outlet-side ends of the honeycomb substrate into the exit cells to give a Pt-carrying rate of 0.66 g per 100% by mass of support upon calcination to form the second catalytic layer (with length Ls in the extending direction, equivalent to 55% of the entire partition wall length; thickness $T_2$, equivalent to 20% of the overall partition wall thickness) in micro pores of the partition walls facing the exit cells.

The resultant was dried at 150° C. for one hour and then calcined at 500° C. for one hour to obtain an exhaust gas purification catalyst (Example 1). Example 1 is a reference where two catalytic layers are provided both to the interior of partition walls.

EXAMPLE 2

The second catalytic layer was provided to the surface of the partition walls facing the exit cells. Otherwise in the same manner as Example 1, an exhaust gas purification catalyst (Example 2) was fabricated. In Example 2, because of a difference in features (average particle diameters) of $Al_2O_3$ powder as the support, the first catalytic layer was formed in the interior of the partition walls while the second catalytic layer was formed on the surface of the partition walls facing the exit cells. With respect to the second catalytic layer, the length $L_2$ in the extending direction is 55% of the entire partition wall length and the thickness $T_2$ is 20% of the entire partition wall thickness.

The characteristics of the exhaust gas purification catalysts of the respective Examples are summarized in Table 1 below.

TABLE 1

Studies on where catalytic layers are formed

| | 1st catalytic layer | | | 2nd catalytic layer | | | |
|---|---|---|---|---|---|---|---|
| | Catalytic metal | Location | Length $L_1$ in running direction (%)* | Catalytic metal | Location | Length $L_2$ in running direction (%)* | Overlap $L_1 + L_2 - 100$ (%) |
| Ex. 1 | Rh | interior | 55 | Pt | interior | 55 | 10 |
| Ex. 2 | | interior | | | surface | | |

*Values when the entire partition length $L_w$ in the cylindrical axial direction is 100%

<Evaluation of Exhaust Gas Purification Ability>

The resulting exhaust gas purification catalysts (Examples 1 and 2) were installed in the exhaust pipe of gasoline engine and their exhaust gas purification abilities were compared. In particular, the exhaust gas purification catalysts (Examples 1 and 2) were individually installed in the exhaust system on an engine bench and measured for changes in % HC (propylene here) purified when the test temperature of exhaust (entering gas temperature) was gradually decreased. The results are shown in FIG. 4.

Figure 4:
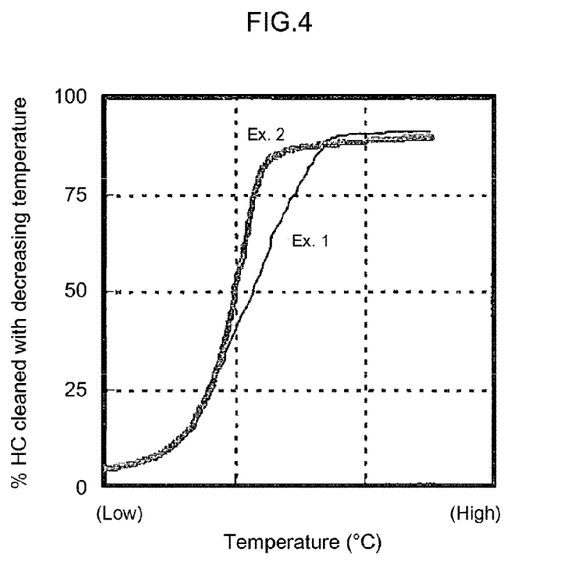
FIG. 4 shows a graph comparing the HC purification rates (%) of exhaust gas purification catalysts.

As evident from FIG. 4, in Example 2 where the second catalytic layer was formed on the partition wall surface, the excellent purification ability was maintained and displayed at lower temperatures as compared to Example 1 where the second catalytic layer was formed in the partition walls. From this, it has been found that the second catalytic layer placed on the partition wall surface is effective in enhancing the purification performance. Separately, an exhaust gas purification catalyst in which the first catalytic layer had been formed on the partition wall surface was examined, resulting in the finding of a significant pressure loss. In addition, with respect to an exhaust gas purification catalyst where the two catalytic layers had been formed on the partition wall surface, because the catalytic layers lacked width (depth) in the thickness direction of the catalytic layers, the purification performance degraded.

From the above, in view of obtaining a balance between reducing the increase in pressure loss and maintaining/increasing the exhaust gas purification performance, the embodiment where the first catalytic layer is formed in the interior of the partition walls while the second catalytic layer is formed on the surface of the partition walls is superior, for example, to the embodiment where the first catalytic layer is formed on the partition wall surface and the embodiment where the second catalytic layer is formed in the partition walls. These results indicate the technical significance of the present invention.

<<II. Studies on Length of Second Catalytic Layer>>

Here, the second catalytic layer was examined with respect to the length in its extending direction.

EXAMPLE 3

The length $L_1$ of the first catalytic layer in its extending direction was 80% of the entire partition wall length and the length $L_2$ of the second catalytic layer in its extending direction was 50% of the entire partition wall length. Otherwise in the same manner as I. Example 2 above, an exhaust gas purification catalyst (Example 3) was fabricated, in which the first catalytic layer was formed in the interior of the partition walls and the second catalytic layer was formed on the surface of the partition walls facing the exit cells.

EXAMPLE 4

The length $L_2$ of the second catalytic layer in its extending direction was 40% of the entire partition wall length. Otherwise in the same manner as Example 3, an exhaust gas purification catalyst (Example 4) was fabricated.

EXAMPLE 5

The length $L_2$ of the second catalytic layer in its extending direction was 30% of the entire partition wall length. Otherwise in the same manner as Example 3, an exhaust gas purification catalyst (Example 5) was fabricated.

EXAMPLE 6

The length $L_2$ of the second catalytic layer in its extending direction was 20% of the entire partition wall length. Otherwise in the same manner as Example 3, an exhaust gas purification catalyst (Example 6) was fabricated.

The characteristics of the exhaust gas purification catalysts of the respective examples are summarized in Table 2.

TABLE 2

Studies on length of second catalytic layer

| | 1st catalytic layer | | | 2nd catalytic layer | | | Test results | | |
|---|---|---|---|---|---|---|---|---|---|
| | Catalytic metal | Location | Length $L_1$ in running direction (%)*1 | Catalytic metal | Location | Length $L_2$ in running direction (%)*1 | Overlap $L_1 + L_2 - 100$ (%) | % increase in pressure drop*2 | HC T50 (° C.) |
| Ex. 3 | Rh | interior | 80 | Pt | surface | 50 | 30 | M | 343.5 |
| Ex. 4 | | | | | | 40 | 20 | G | 342.9 |
| Ex. 5 | | | | | | 30 | 10 | E | 343.9 |
| Ex. 6 | | | | | | 20 | 0 | E | 347.8 |

*1 Values when the entire partition length $L_w$ in the cylindrical axial direction is 100%
*2 Relative values based on the pressure drop with the substrate alone <Evaluation of Pressure Loss>

The resulting exhaust gas purification catalysts (Examples 3 to 6) were installed in the exhaust pipe of gasoline engine and their pressure loss were compared. In particular, the exhaust gas purification catalysts (Examples 3 to 6) were individually installed in the exhaust system on an engine bench and first subjected to an endurance test carried out at 750° C. for 50 hours. The exhaust gas purification catalysts (Examples 3 to 6) after the endurance test were then measured for pressure loss (kPa). As the standard, the substrate was also subjected by itself to a measurement of pressure loss (kPa). The results are shown in Table 2. In Table 2, with the standard being the pressure loss of the substrate alone, when the increase in pressure loss was 5% or less relative to the standard, it is indicated as "E" (excellent); when 10% or less, "G" (good); when 50% or less, "M" (mediocre).

As evident from Table 2, with decreasing length of the second catalytic layer in its extending direction, the pressure loss decreased. In particular, the increase in pressure loss was reduced to a greater extent when the length of the second catalytic layer in its extending direction was 40% or less of the entire partition wall length $L_w$, preferably 30% or less, or especially 20% or less.

<Evaluation of Purification Ability>

The purification abilities of the exhaust gas purification catalysts obtained above were compared. In particular, each exhaust gas purification catalyst was placed in a rig; while the temperature of the gas entering the catalyst was increased with a heat exchanger from 150° C. at a rate of 50° C./min, model exhaust gas was allowed to flow in and the concentration of HC (propylene here) was measured at the exit of the catalyst; when the gas concentration at the exit reached 50% by mole of the gas concentration at the entrance, the temperature (temperature at 50% purification rate, T50) was evaluated. The results are shown in Table 2. It is noted that a lower T50 temperature indicates greater purification ability.

As evident from Table 2, with respect to Examples 3 to 5 where the first and second catalytic layers were overlapped in their extending direction over a length equivalent to 10% to 30% of the entire partition wall length $L_w$, relatively high purification abilities were displayed as compared to Example 6 with no overlapping. From this, it has been found that with the two catalytic layers partially overlapping each other in the extending direction, a relatively high exhaust gas purification ability can be obtained.

Specific embodiments of the present invention are described above, but these are merely for illustration and do not limit the scope of the claims. The art according to the claims include various modifications and changes made to the specific embodiments illustrated above.

REFERENCE SIGNS LIST 1 honeycomb substrate
1a end
2 closed section
4 opening
6, 26 partition walls
10 exhaust gas purification catalyst
22 plug
24 entrance cells
24a exhaust inlet-side ends
25 exit cells
25a exhaust outlet-side ends
261 first catalytic layer
262 second catalytic layer

The invention claimed is:

1. A wall-flow type exhaust gas purification catalyst placed in an exhaust pipe of an internal combustion system that is configured to purify exhaust gas emitted from the internal combustion system, with the exhaust gas purification catalyst comprising:
    a substrate that has a wall-flow structure and comprises an entrance cell whose exhaust inlet side has an open end as well as an exit cell whose exhaust outlet side has an open end wherein the cells are separated with a porous partition wall,
    a first catalytic layer formed in the porous partition wall facing the entrance cell, from the exhaust inlet-side end in an extending direction of the porous partition wall, and
    a second catalytic layer formed on a surface of the porous partition wall facing the exit cell, from the exhaust outlet-side end in the extending direction of the porous partition wall, having a length shorter than the porous partition wall having an entire length $L_w$,
    wherein in a thickness direction vertical to the extending direction, the partition wall has an overall thickness $T_w$ and the first catalytic layer is formed to a thickness $T_1$ that is 60% or greater of the $T_w$.

2. The exhaust gas purification catalyst according to claim 1, wherein the second catalytic layer has a length $L_2$ in the extending direction, equivalent to 10% or greater, but 50% or less of the $L_w$.

3. The exhaust gas purification catalyst according to claim 1, wherein the first catalytic layer has a length $L_1$ in the extending direction, equivalent to 60% or greater, but 90% or less of the $L_w$.

4. The exhaust gas purification catalyst according to claim 1, wherein, in a thickness direction vertical to the extending direction, the porous partition wall has an overall thickness $T_w$ and the second catalytic layer is formed to a thickness $T_2$, equivalent to 30% or less of the $T_w$ on the surface of the porous partition wall facing the exit cell.

5. The exhaust gas purification catalyst according to claim 1, wherein, in the extending direction, the first and second catalytic layers have lengths $L_1$ and $L_2$ that satisfy the next inequality $L_w < (L_1 + L_2) < 2L_w$, with the first and second catalytic layers partially overlapping in the extending direction.

6. The exhaust gas purification catalyst according to claim 5, wherein the first and second catalytic layers overlap over a length equivalent to 5% or greater, but 20% or less of the $L_w$.

7. The exhaust gas purification catalyst according to claim 1, wherein, the thickness $T_1$ is 80% or greater of the $T_w$.

8. The exhaust gas purification catalyst according to claim 1, wherein, the thickness $T_1$ is less than 100% of the $T_w$.

9. The exhaust gas purification catalyst according to claim 1, wherein, the thickness $T_1$ is 95% or less of the $T_w$.

10. A wall-flow type exhaust gas purification catalyst placed in an exhaust pipe of an internal combustion system that is configured to purify exhaust gas emitted from the internal combustion system, with the exhaust gas purification catalyst comprising:

a substrate that has a wall-flow structure and comprises an entrance cell whose exhaust inlet side has an open end as well as an exit cell whose exhaust outlet side has an open end wherein the cells are separated with a porous partition wall, a first catalytic layer formed in the porous partition wall facing the entrance cell, from the exhaust inlet-side end in an extending direction of the porous partition wall, and a second catalytic layer formed on a surface of the porous partition wall facing the exit cell, from the exhaust outlet-side end in the extending direction of the porous partition wall, having a length shorter than the porous partition wall having an entire length $L_w$, wherein each of the first catalytic layer and the second catalytic layer contains a purification catalyst for cleaning exhaust gas, and wherein the purification catalyst in the first catalytic layer consists of a precious metal of the platinum group.

11. The exhaust gas purification catalyst according to claim 10, wherein a relative catalytic metal-carrying rate is lower in the first catalytic layer than in the second catalytic layer.

12. The exhaust gas purification catalyst according to claim 11, wherein each of the catalytic metal-carrying rates of the first catalytic layer and the second catalytic layer is in a range of from 0.05% to 1.5% by mass of the respective catalytic layers.

13. The exhaust gas purification catalyst according to claim 11, wherein each of the catalytic metal-carrying rates of the first catalytic layer and the second catalytic layer is in a range of from 0.2% to 1% by mass of the respective catalytic layers.

\* \* \* \* \*